May 21, 1957 N. C. WILLIAMS 2,792,916
PNEUMATIC BRAKE SYSTEM
Filed Dec. 19, 1955 2 Sheets-Sheet 2
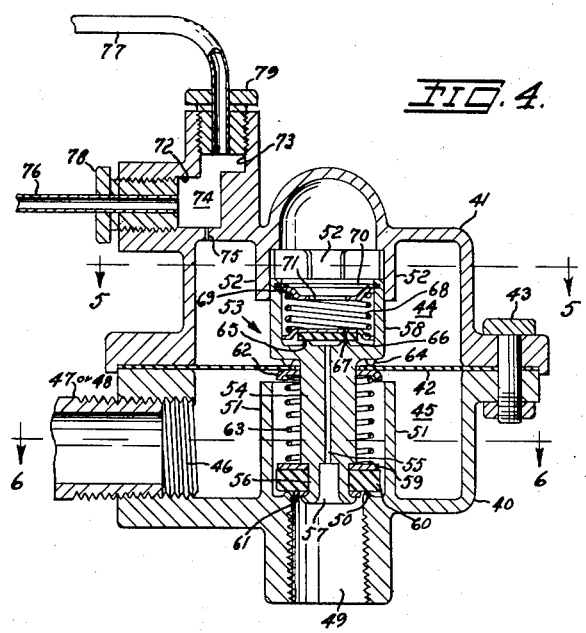
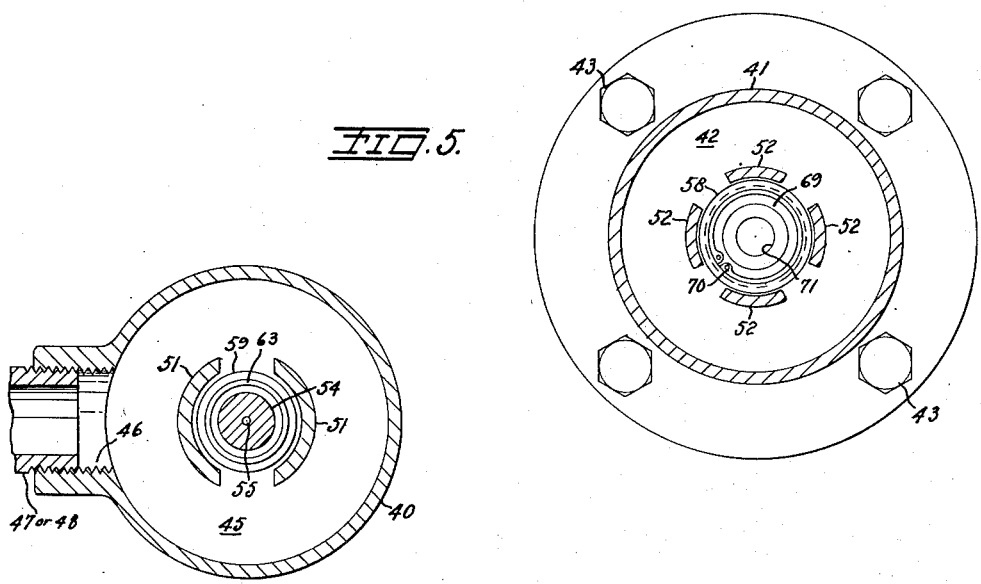
INVENTOR.
Norman C. Williams
BY
AGENT

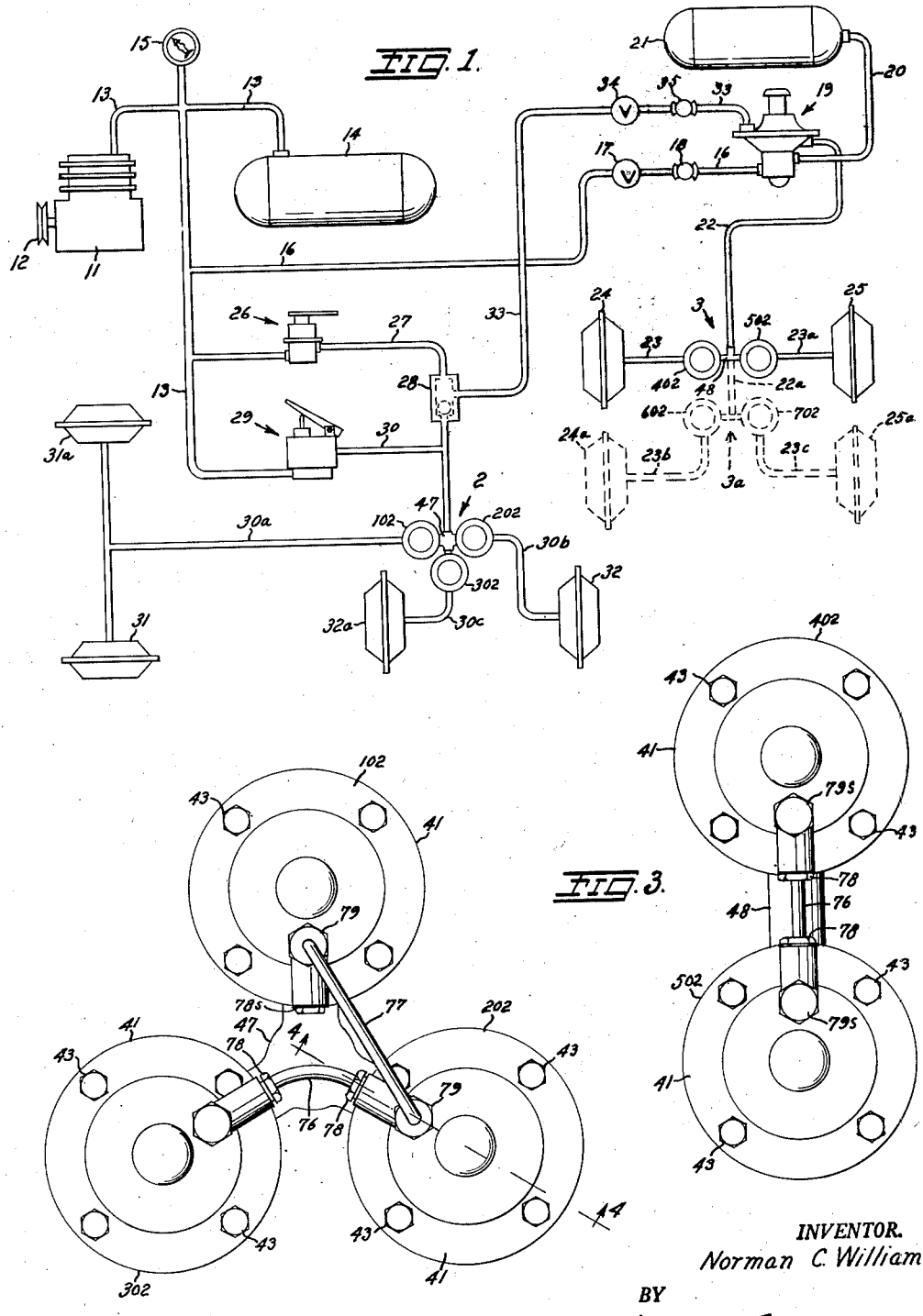

United States Patent Office 2,792,916
Patented May 21, 1957

2,792,916

PNEUMATIC BRAKE SYSTEM

Norman C. Williams, Portland, Oreg., assignor to Power Brake Equipment Company, a corporation of Oregon Application December 19, 1955, Serial No. 553,843

9 Claims. (Cl. 188—151)

This invention relates generally to pneumatic brake systems one type of which is illustrated and described in my joint application S. N. 499,831 with Rollin W. Fishwood filed August 16, 1954 for a patent on an Emergency Relay Valve.

More particularly this invention relates to such a system equipped with one or more clusters of interconnected shut off valves, the valves of each cluster being fed from a common brake operator supply line and each of the valves of one cluster feeding one or more brake operators.

It is the primary purpose of this invention to provide such a system with one or more such valve clusters in which the valves are so constructed and interconnected that when brake application air is supplied to the valves by the supply line, all of the valves of the cluster will open to supply operating air to their respective brake operators.

It is an essential secondary purpose to provide such a system with such a valve cluster so constructed and interconnected that when brake application air is supplied to all of the valves of the cluster by the supply line, should one of the valves be feeding a defectively leaking brake operator or line from the valve thereto the valve will open long enough normally to fill the operator and line thereto. Then if the pressure in the line to the operator does not rise normally the valve will close to prevent further waste of air.

It is a third purpose to provide such a system with such a valve cluster so constructed and interconnected that should a leak develop in the system on the operator side of one of the valves of the cluster when air is being supplied to the operator the valve will close to prevent the continued loss of air through the leak.

It is a fourth purpose to provide such a system with such a valve cluster so constructed and interconnected that so long as one valve of the cluster and its operator and line to its operator are in normal operation any other valve of the cluster with a defectively operating operator or line thereto will be automatically operated to its closed position after operating air has been supplied to the cluster.

It is a fifth purpose to provide such a system with a valve cluster so constructed and interconnected by passages sufficiently restricted to delay the interchange of valve operating air between the valves of the cluster for a sufficient time to prevent the closing of a valve of the cluster on a false indication of a defective operator or line thereto.

How these and other objects are attained is explained in the following description referring to the attached drawing in which Figure 1 is a schematic view of a system of this invention indicating the useful positions in the system of the new and useful valve clusters of the invention and the individual valves of the clusters.

Figure 2 is an enlarged plan view of a triple valve cluster of this invention as utilized in position 2 of Figure 1.

Figure 3 is an enlarged plan view of a double valve cluster of this invention as utilized in position 3 of Figure 1.

Figure 4 is an enlarged sectional view in elevation of one of the valves of the cluster of Figure 2 viewed along the line 4—4 of Figure 2.

Figure 5 is a plan sectional view of the valve along the line 5—5 of Figure 4.

Figure 6 is a plan sectional view along the line 6—6 of Figure 4.

Like numerals of reference refer to like parts in the several figures of the drawings.

It is to be understood that the system of Figure 1 is the braking system of a truck and trailer combination automotive train of the type described generally in application S. N. 499,831 above referred to.

Referring now to Figure 1 an air compressor 11 driven by means not shown through a driven pulley 12 is understood to be equipped with driving and control means adapted to cause the compressor to supply air through air line 13 to truck mounted air storage tank 14 and to control the air pressure in tank 14 between preset limits as indicated on pressure gage 15. Emergency air line 16 including manual cut-off cock 17 and truck to trailer line coupling 18 connects line 13 from tank 14 with emergency air relay valve 19.

Line 20 connects valve 19 with trailer tank 21.

Hand throttle 26 connects line 13 from tank 14 to service line 27 leading to two way check valve 28. Foot throttle 29 connects line 13 to service line 30 valve cluster 2 and check valve 28. Service line 33 including manual cut-off cock 34 and coupling 35 connects check valve 28 with valve 19.

It is understood that when the truck and trailer are separated, hand cocks 17 and 34 are closed and couplings 18 and 35 are disconnected. In this case the truck is operated alone and the truck brakes are actuated by foot throttle 29 controlling the air supplied from tank 14 through lines 13 and 30 and the triple cluster 2 of valves 102, 202, 302 respectively through line 30a to front wheel brake operators 31, 31a, through line 30b to rear wheel brake operator 32 and through line 30c to rear wheel brake operator 32a. It is understood that it is not desirable to use one front wheel brake if the other is inoperative but that one rear wheel brake is still safely usable if the other is inoperative.

When both truck and trailer are in use couplings 18 and 35 in lines 16 and 33 are connected as shown and valves 17 and 34 are open. Trailer brake operating air from tank 14 through line 16 is fed through valve 19 and line 20 to trailer air reservoir tank 21. Valve 19 under the control of air from tank 14 modulated by either hand valve 26 or foot valve 29 through lines 27 or 30 and line 33 supplies operating air through line 22, dual valve cluster 3 and lines 23, 23a to the brake operators 24, 25 of the opposite wheels of one trailer axle. And if the trailer has a second axle with wheel brakes line 22 can be extended as line 22a, a second dual valve cluster 3a can be added and the additional brake operators 24a and 25a can be supplied with operating air from line 22 through lines 23b and 23c controlled by the additional dual valve cluster 3a.

The operation of the system up to and including lines 30 and 22 is completely explained in application S. N. 499,831 above referred to and will not be repeated here since the present invention comprises an improved system in which the valve clusters 2 or 3 or multiples thereof are used to distribute the operating air to the brakes from modulated pressure operating air lines such as 30 and 22.

Individual valves 102, 202, 302, 402, 502, 602 and 702 of valve clusters 2, 3 or 3a are identical and their structure is illustrated in Figures 4, 5 and 6 where it is seen that the valve casing includes a lower part 40 and an upper part 41 between which flexible diaphragm 42 is sealed by bolts 43 to form upper chamber 44 and lower chamber 45.

Threaded inlet opening 46 formed in the side wall of lower casing 40 is adapted to receive one nozzle of a three cluster fitting 47 or of a two cluster fitting 48 fed respectively by air line 30 or air line 22 as the case may be.

Threaded outlet opening 49 formed in the bottom wall of lower casing 40 is adapted to deliver operating air to one or more operating cylinders through air lines such as 30b or 30a. Surrounding opening 49 at its inside end is main valve seat 50. Concentric with valve seat 50 and spaced therefrom are a pair of air baffles and valve guides 51. Depending from the upper wall of upper casing 41 are four guiding fingers 52 adapted freely to guide main valve stem 53 for motion axially of main valve seat 50.

Valve stem 53 is seen to be formed with a middle section 54 with a small axial bore 55, a reduced diameter lower end section 56 with a counterbore 57 and an enlarged hollow upper end 58. Secured on lower end section 56 by riveting the end as shown are metal washer 59, main valve 60 and metal washer 61. Diaphragm 42, inverted pan washer 62 and spring 63 are placed as shown over stem section 54 before parts 59, 60 and 61 are riveted in place.

Annular diaphragm sealing seat 64 is formed on stem 53 as depending from the lower side of stem section 58. Diaphragm 42 is only sealed to seat 64 by the light pressure of spring 63 exerted through washer 62. It should be noted that the diameter of the central hole in diaphragm 42 is larger than the diameter of section 54 of stem 53 and therefore diaphragm 42 and seat 64 form a check valve biased towards its closed position by spring 63 and opened whenever the air pressure in space 44 presses on diaphragm 42 with greater force than the air pressure in space 45.

Formed on the bottom interior of hollow upper section 58 of stem 53 is annular check valve seat 65 concentric with bore 55. Check valves 66 held in pan disk 67 is biased downwardly onto check valve seat 65 by spring 68 strained between pan disk 67 and pan washer 69 backed up by C-washer 70. Disk 67 is formed with an outer flange or rim of finger construction or perforated to allow air to pass freely thereby. Washer 69 passes air freely through its central hole 71. When check valve 66 is off its seat 65, bore 55 of stem 53 is in free communication with upper interior space 44 through valve 65, 66 around disk 67 and through hole 71 in washer 69.

Formed integrally with upper casing 41 of the valve of Figure 4 is a control conduit entrance addition with two threaded openings 72, 73 leading from outside the casing to a control air chamber 74, communicating with upper chamber 44 through a restricted orifice 75. Threaded openings 72, 73 are either or both for the purpose of connecting the control air chambers 74 of the several valves of a cluster by small conduits like 76, 77 fixed in the openings 72, 73 as required by attachment plugs 78, 79. If only one conduit 76, 77 is required the other opening 72, 73 is closed by a solid plug 78s or 79s in other ways similar to 78 or 79. See Figures 2 and 3 for the use of conduits 76, 77. These conduits and fittings are omitted from clusters 2, 3 and 3a of Figure 1 to avoid confusing detail but in Figure 1 cluster 2 would appear in plan view like the cluster of Figure 2 and cluster 3 would appear in plan view like the cluster of Figure 3, while valves 602 and 702 of cluster 3a would be connected respectively to valves 402 and 502 by conduits like conduit 77 of Figure 4.

To show the operation of the braking system of this invention it should first be understood that a new and useful cluster of identical valve mechanisms as above described and shown typically in Figures 1, 2, 4, 5 and 6 has for its purpose the passing without hinderance of operating air from a driver controlled air line 30 to the several brake operators through their respective air lines. But should any of the lines like 30a, 30b or 30c be feeding an air leak of any importance the valve 102, 202 or 302 feeding the line with the leak will close and shut off the supply of air to that line. Also it should be understood that other valves and systems have been used to accomplish this result but as far as known none of the previous systems have been free of false operations as is the present system.

With the vehicle not requiring braking effort throttle valve 29 is closed and no air pressure is on line 30 or cluster fitting 47 and therefor all of the valves 102, 202 and 302 are in the condition shown in Figure 4 with no pressure at inlet 46 or in space 45 and no pressure at brake cylinder line opening 49. Spring 63 holds diaphragm 42 lightly sealed against seal ring on seat 64, spring 68 lightly holds check valve 66 on its seat 65 and valve stem 53 by its weight holds valve 60 on its seat 50.

When braking effort is desired operating air is admitted to line 30 from valve 29 and through fitting 47 air under pressure is admitted to space 45 in each of the valves 102, 202, and 302. The air pressure in space 45 immediately moves diaphragm 42 upward taking with it stem 54 and raising main valve 60 from its seat 50. Air is thus admitted to all of the brake lines by valves 102, 202, and 302 at an operating pressure controlled by throttle 29. The brake operating cylinders immediately fill with air and the air pressure backs up on the brake side of main valves 50—60 where air pressure is then exerted on valve stem bores 57, 55 to open check valve 65, 66 and relatively slowly pass air to upper chamber 44 to counteract the pressure on diaphragm 42 of the air pressure in space 45 and let valve stem 53 settle of its own weight to again close main valve 50—60. Spring 68 is relatively light and check valve 65, 66 will stay open as long as the pressure at opening 49 is greater than in space 44.

If all is well and pressure in space 44 builds up normally, soon the pressure in space 44 is built up to allow both the main valve 50, 60 and check valve 65, 66 to close. At the same time air under pressure from each of the valves 102, 202, and 302 is passing restricted orifices 75 to chambers 74 where the air from all of the chambers 74 intermingles through conduits 76, 77 and becomes uniform in pressure.

Should one of the brake lines 30a, 30b or 30c be feeding into a leak the back pressure at its opening 49 will not build up sufficiently to open check valve 65, 66 so that pressure in space 44 will only build up after one or more of the other valves have actuated their brake cylinders and built up such pressures in their spaces 44 that through the restricted passages 75 and the chambers 74 the space 44 of the valve feeding the leaky line will be supplied sufficient air to overcome the pressure under the diaphragm in its space 45 to allow the main valve 50, 60 to close.

One of the secrets of the successful operation of this valve cluster system is to so restrict bore 55 that the air pressures in spaces 44 and 45 will not be equalized through bore 55 before the air in the brake operator line and the brake operator has come up to the pressure in space 45. The time delay in building up pressure in space 44 to close main valve 50—60 must be sufficient to be sure that the air pressure at the brake cylinder is built up to the pressure in the air line nozzle 47.

Again where, as shown in Figure 1, valve 102 feeds a longer brake air line 30a and two brake cylinders 31 and 31a it will take longer for valve 102 to supply the required air to its brake operators than it will for valves 202 and 203 to supply air to their brake operators. Consequently air from valves 202 and 203 must not be allowed to feed back to valve 102 through conduits 76, 77, chamber 74 and orifice 75 to space 44 to balance the pressures in spaces 44, 45 and close main valve 50—60 before the required brake air has passed valve 50—60 of 102. Therefore another secret of the successful operation of the valve cluster of this system is to so restrict orifice or bore 75 as to prevent the too rapid equalization of air pressures in spaces 44 by air flow through tubes 76, 77.

After the need for braking action is over and valve 29 has been manipulated to exhaust line 30 to atmosphere the pressure in spaces 45 of all of the valves are reduced to atmosphere and check valves 42, 64 open to exhaust spaces 44 to spaces 45 or atmosphere after which all of the valve parts are again in the positions shown in Figure 4.

Although the above explanation of the valve cluster operation has been directed to the triple cluster of Figure 2 in the system of Figure 1 it is apparent that the same explanation is effective for the operation of the double cluster 3 or the cluster of four 3 and 3a.

Having thus recited some of the objects or purposes of the invention, illustrated and described a preferred way in which the invention may be practiced and explained its operation, I claim:

1. A pneumatic brake system comprising a source of air under pressure, a plurality of pneumatic brake operators to be supplied with air from said source, a plurality of brake air conduits leading respectively to said brake operators, a control air conduit leading from said source of air to all of said brake air conduits, a control valve in said control air conduit, said control valve being operable to modulate the pressure of the air supplied to said brake air conduits through said control conduit from said source, a plurality of safety shutoff valve devices, each of said valve devices being connected into a respective one of said brake air conduits, and each one of said valve devices comprising a hollow body divided interiorly into a first air space and a second air space, an air inlet port formed through said body for connecting said first air space through one part of a respective one of said brake air conduits to said control conduit, an air outlet port formed through said body for connecting said first air space through the other part of said respective one of said brake air conduits to its respective one of said brake operators, a first air conduit connecting said air outlet port with said second space, a second air conduit connecting said two air spaces, a third air conduit for connecting the second air space of said each one of said devices with the second air spaces of each other of said devices, a main air valve for controlling the flow of air from said first space out said air outlet port to its respective brake operator, a main air valve operator for operating said main air valve to pass air from said first air space out said air outlet port only when the air pressure in said first space is greater than the air pressure in said second space, a first check valve for permitting the passage of air through said first air conduit only when the air pressure at said air outlet port is greater than the air pressure in said second space and a second check valve for permitting the passage of air through said second air conduit only when the air pressure in said second air space is greater than the air pressure in said first air space.

2. The system of claim 1 in which said first air conduit is constricted to retard the flow of air therethrough.

3. The system of claim 1 in which said third air conduit is constricted to retard the flow of air therethrough.

4. In a pneumatic brake system comprising a pair of pneumatic brake operators each having a brake air line fed through a control air line from a source of air under pressure, a pair of safety shutoff valve devices connected one each in the brake air lines of said pair of brake operators, each one of said pair of valve devices comprising a hollow body divided interiorly to form a first air space and a second air space, an air inlet port formed through said body for connecting said first air space through one part of its respective one of said brake air lines to said control air line, an air outlet port formed through said body for connecting said first air space through the other part of its respective one of said brake air lines to its respective brake operator, a first air conduit connecting said air outlet port with said second air space, a second air conduit connecting said two air spaces, a third air conduit for connecting the second air spaces of said pair of devices, a main air valve responsive to the difference in air pressure in said two air spaces for passing air from said first air space to said air outlet port when the air pressure in said first air space is greater than the air pressure in said second air space, a first check valve for permitting the passage of air through said first air conduit only when the air pressure at said air outlet port is greater than the air pressure in said second space and a second check valve for permitting the passage of air through said second air conduit only when the pressure in said second air space is greater than the pressure in said first air space.

5. The system of claim 4 in which said first air conduit is constricted to retard the flow of air therethrough.

6. The system of claim 4 in which said second air conduit is constricted to retard the flow of air therethrough.

7. A safety shutoff valve device comprising a first hollow body forming a first air space, an air inlet port to said first air space formed through said first hollow body, an air outlet port from said first space formed through said first hollow body, a second hollow body forming a second air space, a first air conduit connecting said air outlet port with said second space, a second air conduit connecting said two air spaces, a third air conduit connecting said second air space with the exterior of said second hollow body, a main air valve responsive to the difference in the air pressure of said two air spaces for passing air from said first space to said air outlet port when the air pressure in said first air space is greater than the air pressure in said second air space, a first check valve for permitting the passage of air through said first air conduit only when the air pressure at said air outlet port is greater than the air pressure in said second space and a second check valve for permitting the passage of air through said second air conduit only when the air pressure in said second space is greater than the air pressure in said first space.

8. The valve device of claim 7 in which said first air conduit is constricted to retard the passage of air therethrough.

9. The valve device of claim 7 in which said second air conduit is constricted to retard the passage of air therethrough.

References Cited in the file of this patent
UNITED STATES PATENTS
2,633,147   Badami _____ Mar. 31, 1953